United States Patent
Sharaby et al.

(10) Patent No.: US 9,484,123 B2
(45) Date of Patent: Nov. 1, 2016

(54) CONDUCTIVE SEALANT COMPOSITIONS

(75) Inventors: Ahmed Sharaby, Acton, CA (US); Ponchivy Tan, Canyon Country, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 742 days.

(21) Appl. No.: 13/608,241

(22) Filed: Sep. 10, 2012

(65) Prior Publication Data

US 2013/0075668 A1 Mar. 28, 2013

Related U.S. Application Data

(60) Provisional application No. 61/535,886, filed on Sep. 16, 2011.

(51) Int. Cl.
| | |
|---|---|
| *H01B 1/22* | (2006.01) |
| *G21F 1/00* | (2006.01) |
| *H01B 1/04* | (2006.01) |
| *G21F 1/02* | (2006.01) |
| *H01B 1/24* | (2006.01) |
| *B82Y 30/00* | (2011.01) |

(52) U.S. Cl.
CPC ............ *H01B 1/04* (2013.01); *G21F 1/02* (2013.01); *H01B 1/22* (2013.01); *H01B 1/24* (2013.01); *B82Y 30/00* (2013.01); *Y10S 977/742* (2013.01)

(58) Field of Classification Search
CPC ............ H01B 1/00; H01B 1/22; H01B 1/24; G21F 1/00; G21F 1/02
See application file for complete search history.

(56) References Cited

U.S. PATENT DOCUMENTS

| | | |
|---|---|---|
| 3,782,856 A | 1/1974 | Salkind et al. |
| 4,156,067 A | 5/1979 | Gould |
| 4,296,172 A | 10/1981 | Hill |
| 4,319,300 A | 3/1982 | Napiorkowski et al. |
| 4,320,435 A | 3/1982 | Jones |
| 4,375,493 A | 3/1983 | George et al. |
| 4,429,216 A | 1/1984 | Brigham |
| 4,454,379 A | 6/1984 | Cleveland et al. |
| 4,478,963 A | 10/1984 | McGarry |
| 4,557,560 A | 12/1985 | Bohannon, Jr. et al. |
| 4,559,112 A | 12/1985 | Tamamura et al. |
| 4,601,828 A | 7/1986 | Gershoni |
| 4,698,723 A | 10/1987 | Bryan, Jr. |
| 4,724,316 A | 2/1988 | Morton |
| 4,752,415 A | 6/1988 | Iwaskow et al. |
| 4,760,845 A | 8/1988 | Kovalcheck |
| 4,808,481 A | 2/1989 | Luxon |
| 4,839,771 A | 6/1989 | Covey |
| 4,882,089 A | 11/1989 | Iwaskow et al. |
| 4,983,456 A | 1/1991 | Iwaskow et al. |
| 5,115,035 A | 5/1992 | Shiraki et al. |
| 5,185,654 A | 2/1993 | Mosher et al. |
| 5,225,265 A | 7/1993 | Prandy et al. |
| 5,273,706 A | 12/1993 | Laughner |
| 5,284,888 A | 2/1994 | Morgan |
| 5,298,708 A | 3/1994 | Babu et al. |
| 5,314,309 A | 5/1994 | Blakeley et al. |
| 5,352,254 A | 10/1994 | Celikkaya |
| 5,354,499 A | 10/1994 | Elliott |
| 5,370,921 A | 12/1994 | Cedarleaf |
| 5,401,901 A | 3/1995 | Gerry et al. |
| 5,417,743 A | 5/1995 | Dauber |
| 5,422,423 A | 6/1995 | Shacklette et al. |
| 5,431,974 A | 7/1995 | Pierce |
| 5,490,893 A | 2/1996 | Enlow et al. |
| 5,560,934 A | 10/1996 | Afzali-Ardakani et al. |
| 5,570,265 A | 10/1996 | Smith |
| 5,603,514 A | 2/1997 | Jencks et al. |
| 5,612,130 A | 3/1997 | Smirnov et al. |
| 5,698,316 A | 12/1997 | Kuras et al. |
| 5,700,743 A | 12/1997 | Puchinger et al. |
| 5,725,707 A | 3/1998 | Koon et al. |
| 5,736,603 A | 4/1998 | Pfeiffer et al. |
| 5,789,085 A | 8/1998 | Blohowiak et al. |
| 5,810,094 A | 9/1998 | Kesler et al. |
| 5,814,137 A | 9/1998 | Blohowiak et al. |
| 5,869,172 A | 2/1999 | Caldwell |
| 5,870,160 A | 2/1999 | Yanagawa et al. |

(Continued)

FOREIGN PATENT DOCUMENTS

| | | |
|---|---|---|
| BR | P10815686-7 A2 | 12/2010 |
| CA | 2 084 626 C | 6/1993 |

(Continued)

OTHER PUBLICATIONS

Donaldson, Ken Poland, Craig Duffin, Rodger Bonner, James. (2012). Toxicology of Carbon Nanotubes—1.6.1 Carbon Nanotube Composites. Cambridge University Press. Online version available at: http://app.knovel.com/hotlink/pdf/id:kt00ARNBT1/toxicology-carbon-nanotubes/carbon-nanotube-composites.*

Enos, D.G., "Understanding the Atmospheric Degradation of Noble Metal-Plated Connector Materials," *Corrosion*, vol. 66, No. 10, Oct. 2010, pp. 105003-1-105003-12.

Dorworth, Louis C., "Repair of Lightning Strike Protection on CFRP Sandwich Structures Using Mesh-Embedded-Syntactic Materials," SAMPE Conference Proceedings (2006) vol. 51, pp. 329-1-329/14.

Ransom, Joy, et al., "Laboratory Testing to Validate Expanded Products for Use in Holes in Composite Structure Joining Applications," SAMPE Conference Proceedings (2008) vol. 53, pp. 70/1-70/16.

(Continued)

*Primary Examiner* — Mark Kopec
(74) *Attorney, Agent, or Firm* — Diane R. Meyers

(57) ABSTRACT

Embodiments of the present disclosure are directed to sealant compositions including a base composition with at least one sulfur-containing polymer, a curing agent composition, and an electrically conductive filler including carbon nanotubes and stainless steel fibers. The electrically conductive filler can be in either or both of the base composition and the curing agent composition. The sealant compositions are substantially Ni-free and exhibit unexpectedly superior EMI/RFI shielding effectiveness.

24 Claims, No Drawings

(56) References Cited

U.S. PATENT DOCUMENTS

| | | |
|---|---|---|
| 5,927,240 A | 7/1999 | Maxon |
| 5,935,698 A | 8/1999 | Pannell |
| 5,939,197 A | 8/1999 | Blohowiak et al. |
| 5,945,643 A | 8/1999 | Casser |
| 5,952,445 A | 9/1999 | Roesler et al. |
| 5,958,578 A | 9/1999 | Blohowiak et al. |
| 6,037,008 A | 3/2000 | Huang et al. |
| 6,092,350 A | 7/2000 | Dumlao et al. |
| 6,099,965 A | 8/2000 | Tennent et al. |
| 6,127,462 A | 10/2000 | Chen et al. |
| 6,142,595 A | 11/2000 | Dellapi et al. |
| 6,159,611 A | 12/2000 | Lee et al. |
| 6,277,916 B1 | 8/2001 | Terbrueggen et al. |
| 6,299,716 B1 | 10/2001 | Bettinger |
| 6,333,101 B1 | 12/2001 | Imashiro et al. |
| 6,483,685 B1 | 11/2002 | Ramarge et al. |
| 6,485,735 B1 | 11/2002 | Steen et al. |
| 6,548,175 B2 | 4/2003 | Sachdev et al. |
| 6,548,189 B1 | 4/2003 | Gunasekaran et al. |
| 6,612,175 B1 | 9/2003 | Peterson et al. |
| 6,737,444 B1 | 5/2004 | Liu |
| 6,790,526 B2 | 9/2004 | Vargo et al. |
| 6,890,373 B2 | 5/2005 | Nemoto et al. |
| 6,906,120 B1 | 6/2005 | Davis et al. |
| 6,916,890 B1 | 7/2005 | Woods et al. |
| 7,001,666 B2 | 2/2006 | Krienke et al. |
| 7,022,763 B2 | 4/2006 | Matsugi et al. |
| 7,056,409 B2 | 6/2006 | Dubrow |
| 7,120,004 B2 | 10/2006 | Hall |
| 7,258,819 B2 | 8/2007 | Harris, IV |
| 7,276,665 B1 | 10/2007 | Rauckman et al. |
| 7,326,862 B2 | 2/2008 | Lionetta et al. |
| 7,371,462 B2 | 5/2008 | Tsumura et al. |
| 7,494,324 B2 | 2/2009 | Hibbard |
| 7,553,553 B2 | 6/2009 | Palumbo et al. |
| 7,629,400 B2 | 12/2009 | Hyman |
| 7,678,997 B2 | 3/2010 | Rawlings |
| 7,686,905 B2 | 3/2010 | Ackerman et al. |
| 7,730,547 B2 | 6/2010 | Barrera et al. |
| 7,745,528 B2 | 6/2010 | Prud'Homme et al. |
| 7,759,298 B2 | 7/2010 | Dufresne et al. |
| 7,772,499 B2 | 8/2010 | Rauckman |
| 7,795,365 B2 | 9/2010 | Karjala et al. |
| 7,842,246 B2 | 11/2010 | Wohlstadter et al. |
| 7,842,387 B2 | 11/2010 | Resasco et al. |
| 7,867,621 B2 | 1/2011 | Rawlings et al. |
| 7,869,181 B2 | 1/2011 | Le |
| 7,883,050 B2 | 2/2011 | Dufresne et al. |
| 7,959,783 B2 | 6/2011 | Byrd et al. |
| 8,337,658 B2 | 12/2012 | Hasegawa et al. |
| 2001/0008672 A1 | 7/2001 | Norvell et al. |
| 2002/0004132 A1 | 1/2002 | Banovetz et al. |
| 2002/0038135 A1 | 3/2002 | Connelly et al. |
| 2002/0108699 A1 | 8/2002 | Cofer et al. |
| 2002/0132075 A1 | 9/2002 | Friend et al. |
| 2003/0055149 A1 | 3/2003 | McGee |
| 2003/0146346 A1 | 8/2003 | Chapman Jr |
| 2003/0152766 A1 | 8/2003 | Vargo et al. |
| 2003/0173460 A1 | 9/2003 | Chapman, Jr. |
| 2003/0216662 A1 | 11/2003 | Jersey-Willuhn et al. |
| 2003/0220432 A1 | 11/2003 | Miller et al. |
| 2004/0009344 A1 | 1/2004 | Krienke et al. |
| 2004/0099659 A1 | 5/2004 | Johnson, Jr. |
| 2004/0100764 A1 | 5/2004 | Hanson et al. |
| 2004/0126504 A1 | 7/2004 | Ouchi et al. |
| 2004/0220327 A1* | 11/2004 | Cosman et al. ............... 524/779 |
| 2005/0025967 A1 | 2/2005 | Lawton et al. |
| 2005/0031843 A1 | 2/2005 | Robinson et al. |
| 2005/0062024 A1 | 3/2005 | Bessette et al. |
| 2005/0088097 A1 | 4/2005 | Bae et al. |
| 2005/0181203 A1 | 8/2005 | Rawlings et al. |
| 2005/0197447 A1 | 9/2005 | Gu et al. |
| 2005/0197450 A1 | 9/2005 | Amano et al. |
| 2005/0218398 A1 | 10/2005 | Tran |
| 2005/0225751 A1 | 10/2005 | Sandell et al. |
| 2005/0266238 A1 | 12/2005 | Amano et al. |
| 2006/0035054 A1 | 2/2006 | Stepanian et al. |
| 2006/0046005 A1 | 3/2006 | McGee |
| 2006/0062983 A1 | 3/2006 | Irvin et al. |
| 2006/0100368 A1* | 5/2006 | Park ............................... 525/50 |
| 2006/0110599 A1 | 5/2006 | Honma et al. |
| 2006/0182949 A1 | 8/2006 | Salnikov et al. |
| 2006/0182950 A1 | 8/2006 | Yun et al. |
| 2006/0188580 A1 | 8/2006 | Sacks |
| 2006/0193789 A1 | 8/2006 | Tamarkin et al. |
| 2006/0274047 A1 | 12/2006 | Spath et al. |
| 2006/0274048 A1 | 12/2006 | Spath et al. |
| 2006/0281219 A1 | 12/2006 | Trezza |
| 2006/0285813 A1 | 12/2006 | Ferguson |
| 2007/0012111 A1 | 1/2007 | Kim |
| 2007/0193770 A1 | 8/2007 | Ueno et al. |
| 2007/0230131 A1 | 10/2007 | Bunyan et al. |
| 2007/0241303 A1 | 10/2007 | Zhong et al. |
| 2007/0275623 A1 | 11/2007 | Mussig |
| 2007/0281116 A1 | 12/2007 | Matviya et al. |
| 2007/0281163 A1 | 12/2007 | Matviya et al. |
| 2007/0281570 A1 | 12/2007 | Liggett et al. |
| 2007/0292622 A1 | 12/2007 | Rowley et al. |
| 2007/0298669 A1 | 12/2007 | Barrera et al. |
| 2008/0020275 A1 | 1/2008 | Koh et al. |
| 2008/0047894 A1 | 2/2008 | Trogolo et al. |
| 2008/0057265 A1 | 3/2008 | Liang et al. |
| 2008/0075954 A1 | 3/2008 | Wardle et al. |
| 2008/0078576 A1 | 4/2008 | Blacker et al. |
| 2008/0083721 A1 | 4/2008 | Kaiserman et al. |
| 2008/0085405 A1 | 4/2008 | Prenzel et al. |
| 2008/0102279 A1 | 5/2008 | Ito et al. |
| 2008/0128430 A1 | 6/2008 | Kovach et al. |
| 2008/0146480 A1 | 6/2008 | Dufresne et al. |
| 2008/0152949 A1 | 6/2008 | Mevellec et al. |
| 2008/0159871 A1 | 7/2008 | Bech |
| 2008/0166563 A1 | 7/2008 | Brittingham et al. |
| 2008/0169521 A1 | 7/2008 | Foster et al. |
| 2008/0294220 A1 | 11/2008 | Stevenson et al. |
| 2008/0302561 A1 | 12/2008 | Prud'Homme et al. |
| 2009/0029147 A1 | 1/2009 | Tang et al. |
| 2009/0035469 A1 | 2/2009 | Sue et al. |
| 2009/0050735 A1 | 2/2009 | Sobol |
| 2009/0054272 A1 | 2/2009 | Prud'Homme et al. |
| 2009/0104361 A1 | 4/2009 | Ma et al. |
| 2009/0118420 A1 | 5/2009 | Zou et al. |
| 2009/0127514 A1 | 5/2009 | Korkut et al. |
| 2009/0220794 A1 | 9/2009 | O'Neill et al. |
| 2009/0223629 A1* | 9/2009 | Cosman et al. ............ 156/307.1 |
| 2009/0236569 A1 | 9/2009 | Pike-Biegunski et al. |
| 2009/0321238 A1 | 12/2009 | Nhan et al. |
| 2010/0000754 A1 | 1/2010 | Mann et al. |
| 2010/0001512 A1 | 1/2010 | Breay et al. |
| 2010/0041297 A1 | 2/2010 | Jiang et al. |
| 2010/0046170 A1 | 2/2010 | Stevenson et al. |
| 2010/0061678 A1 | 3/2010 | Swinehart et al. |
| 2010/0086706 A1 | 4/2010 | Everaerts et al. |
| 2010/0086729 A1 | 4/2010 | Long |
| 2010/0089002 A1 | 4/2010 | Merkel |
| 2010/0096181 A1 | 4/2010 | Nakamura et al. |
| 2010/0096595 A1 | 4/2010 | Prud'Homme et al. |
| 2010/0096597 A1 | 4/2010 | Prud'Homme et al. |
| 2010/0104854 A1 | 4/2010 | Takada et al. |
| 2010/0116527 A1 | 5/2010 | Khosla et al. |
| 2010/0122832 A1 | 5/2010 | Bukshpun et al. |
| 2010/0136327 A1 | 6/2010 | Ma et al. |
| 2010/0165276 A1 | 7/2010 | David et al. |
| 2010/0178487 A1 | 7/2010 | Arai et al. |
| 2010/0182679 A1 | 7/2010 | Han et al. |
| 2010/0209690 A1 | 8/2010 | Sang et al. |
| 2010/0210745 A1 | 8/2010 | McDaniel et al. |
| 2010/0220074 A1 | 9/2010 | Irvin, Jr. et al. |
| 2010/0239871 A1 | 9/2010 | Scheffer et al. |
| 2010/0276630 A1 | 11/2010 | Chandrasekhar et al. |
| 2010/0276645 A1 | 11/2010 | Aspin et al. |
| 2010/0282470 A1 | 11/2010 | Alberty et al. |
| 2010/0321897 A1 | 12/2010 | Hill et al. |
| 2011/0001086 A1 | 1/2011 | Kruckenberg et al. |
| 2011/0036726 A1 | 2/2011 | Majima et al. |

(56) References Cited

U.S. PATENT DOCUMENTS

| | | |
|---|---|---|
| 2011/0049292 A1 | 3/2011 | Kruckenberg et al. |
| 2011/0086206 A1 | 4/2011 | Scheffer et al. |
| 2011/0088931 A1 | 4/2011 | Lettow et al. |
| 2011/0117202 A1 | 5/2011 | Bourke, Jr. et al. |
| 2011/0123906 A1 | 5/2011 | Wang et al. |
| 2011/0133132 A1 | 6/2011 | Zhamu et al. |
| 2011/0133134 A1 | 6/2011 | Varma et al. |
| 2011/0135921 A1 | 6/2011 | Tse et al. |
| 2011/0135925 A1 | 6/2011 | Zhamu et al. |
| 2011/0147674 A1 | 6/2011 | Arai et al. |
| 2011/0154948 A1 | 6/2011 | Chung et al. |
| 2011/0164987 A1 | 7/2011 | Grabau |
| 2011/0171469 A1 | 7/2011 | Shah et al. |
| 2011/0180524 A1 | 7/2011 | Brittingham et al. |

FOREIGN PATENT DOCUMENTS

| | | |
|---|---|---|
| CA | 2 502 128 A1 | 9/2005 |
| CN | 1049021 A | 2/1991 |
| CN | 101192669 A | 6/2008 |
| CN | 101237723 A | 8/2008 |
| CN | 101241803 A | 8/2008 |
| CN | 101409336 A | 4/2009 |
| CN | 101587992 A | 11/2009 |
| CN | 101694818 A | 4/2010 |
| CN | 101771915 A | 7/2010 |
| CN | 101794671 A | 8/2010 |
| CN | 101798882 A | 8/2010 |
| CN | 101844757 A | 9/2010 |
| CN | 101916633 A | 12/2010 |
| DE | 20 2004 009 060 U1 | 9/2004 |
| DE | 20 2004 009 061 U1 | 9/2004 |
| DE | 10 2007 051 797 B3 | 6/2009 |
| EP | 0 126 494 A1 | 11/1984 |
| EP | 0 139 667 A1 | 5/1985 |
| EP | 0 142 857 A2 | 5/1985 |
| EP | 0 145 400 A2 | 6/1985 |
| EP | 0 167 042 A1 | 1/1986 |
| EP | 0 172 039 A2 | 2/1986 |
| EP | 0 173 303 A2 | 3/1986 |
| EP | 0 177 289 A2 | 4/1986 |
| EP | 0 177 579 A1 | 4/1986 |
| EP | 0 182 809 A1 | 6/1986 |
| EP | 0 183 782 A1 | 6/1986 |
| EP | 0 184 829 A2 | 6/1986 |
| EP | 0 191 191 A1 | 8/1986 |
| EP | 0 191 491 A2 | 8/1986 |
| EP | 0 192 199 A2 | 8/1986 |
| EP | 0 192 199 A3 | 8/1986 |
| EP | 0 194 865 A2 | 9/1986 |
| EP | 0 205 815 A1 | 12/1986 |
| EP | 0 206 170 A1 | 12/1986 |
| EP | 0 206 172 A1 | 12/1986 |
| EP | 0 207 236 A2 | 1/1987 |
| EP | 0 208 789 A1 | 1/1987 |
| EP | 0 211 104 A2 | 2/1987 |
| EP | 0 212 970 A2 | 3/1987 |
| EP | 0 213 737 A1 | 3/1987 |
| EP | 0 217 334 A2 | 4/1987 |
| EP | 0 223 408 A2 | 5/1987 |
| EP | 0 223 564 A2 | 5/1987 |
| EP | 0 224 122 A2 | 6/1987 |
| EP | 0 224 795 A2 | 6/1987 |
| EP | 0 230 501 A1 | 8/1987 |
| EP | 0 233 651 A1 | 8/1987 |
| EP | 0 234 385 A1 | 9/1987 |
| EP | 0 234 720 A1 | 9/1987 |
| EP | 0 239 915 A2 | 10/1987 |
| EP | 0 240 083 A2 | 10/1987 |
| EP | 0 240 163 A2 | 10/1987 |
| EP | 0 245 710 A2 | 11/1987 |
| EP | 0 246 337 A1 | 11/1987 |
| EP | 0 247 692 A2 | 12/1987 |
| EP | 0 252 288 A2 | 1/1988 |
| EP | 0 266 879 A1 | 5/1988 |
| EP | 0 276 506 A1 | 8/1988 |
| EP | 0 281 236 A2 | 9/1988 |
| EP | 0 437 979 A2 | 7/1991 |
| EP | 0 550 846 B1 | 7/1993 |
| EP | 0 632 688 A2 | 1/1995 |
| EP | 0 730 017 A2 | 9/1996 |
| EP | 0 790 182 B1 | 8/1997 |
| EP | 0 811 480 A1 | 12/1997 |
| EP | 0 814 183 A1 | 12/1997 |
| EP | 1 055 512 A2 | 11/2000 |
| EP | 1 134 069 A1 | 9/2001 |
| EP | 1 593 293 BI | 11/2005 |
| EP | 1 692 752 B2 | 8/2006 |
| EP | 1 845 296 A2 | 4/2007 |
| EP | 1 926 591 BI | 6/2008 |
| EP | 2 399 739 A1 | 12/2011 |
| GB | 1 143 314 | 2/1969 |
| GB | 2 410 308 A | 7/2005 |
| JP | 60-171247 A | 9/1985 |
| JP | 60-243170 A | 12/1985 |
| JP | 05-156100 A | 6/1993 |
| JP | 2001-172582 A | 6/2001 |
| JP | 2003-092205 A | 3/2003 |
| JP | 2008-207404 A | 9/2008 |
| JP | 2008-218712 A | 9/2008 |
| JP | 2008-251715 A | 10/2008 |
| JP | 2008-284191 A | 11/2008 |
| JP | 2009-043672 A | 2/2009 |
| JP | 2009-272454 A | 11/2009 |
| JP | 2010-131789 A | 6/2010 |
| JP | 2010-131888 A | 6/2010 |
| JP | 2010-194749 A | 9/2010 |
| JP | 2010-248605 A | 11/2010 |
| JP | 2010-260174 A | 11/2010 |
| JP | 2011-042030 A | 3/2011 |
| JP | 2011-142024 A | 7/2011 |
| KR | 10-2007-0003264 A | 1/2007 |
| WO | WO 81/02895 A1 | 10/1981 |
| WO | WO 88/03543 A1 | 5/1988 |
| WO | WO 91/01621 A2 | 2/1991 |
| WO | WO 94/03743 A1 | 2/1994 |
| WO | WO 94/23679 A1 | 10/1994 |
| WO | WO 96/23837 A2 | 8/1996 |
| WO | WO 97/06649 A2 | 2/1997 |
| WO | WO 97/18081 A2 | 5/1997 |
| WO | WO 99/08298 A1 | 2/1999 |
| WO | WO 99/13812 A1 | 3/1999 |
| WO | WO 99/31176 A1 | 6/1999 |
| WO | WO 99/46348 AI | 9/1999 |
| WO | WO 00/22226 A1 | 4/2000 |
| WO | WO 00/49669 A2 | 8/2000 |
| WO | WO 01/17850 A1 | 3/2001 |
| WO | WO 01/63984 A1 | 8/2001 |
| WO | WO 01/77185 A1 | 10/2001 |
| WO | WO 02/24383 A1 | 3/2002 |
| WO | WO 02/093696 A2 | 11/2002 |
| WO | WO 2004/045369 A2 | 6/2004 |
| WO | WO 2005/019297 A1 | 3/2005 |
| WO | WO 2005/106153 A1 | 11/2005 |
| WO | WO 2006/040754 A2 | 4/2006 |
| WO | WO 2006/040754 A3 | 4/2006 |
| WO | WO 2007/015710 A2 | 2/2007 |
| WO | WO 2007/022106 A2 | 2/2007 |
| WO | WO 2007/050725 A1 | 5/2007 |
| WO | WO 2008/056122 A2 | 5/2008 |
| WO | WO 2008/106143 A2 | 9/2008 |
| WO | WO 2008/115883 A1 | 9/2008 |
| WO | WO 2009/012618 A1 | 1/2009 |
| WO | WO 2009/051411 A2 | 4/2009 |
| WO | WO 2009/052817 A2 | 4/2009 |
| WO | WO 2009/086161 A1 | 7/2009 |
| WO | WO 2009/087372 A2 | 7/2009 |
| WO | WO 2009/105036 A1 | 8/2009 |
| WO | WO 2009/111744 A2 | 9/2009 |
| WO | WO 2009/115488 A1 | 9/2009 |
| WO | WO 2010/024564 A2 | 3/2010 |
| WO | WO 2010/035087 A1 | 4/2010 |
| WO | WO 2010/036563 A1 | 4/2010 |
| WO | WO 2010/051102 A2 | 5/2010 |

(56) References Cited

FOREIGN PATENT DOCUMENTS

| WO | WO 2010/093598 A2 | 8/2010 |
|---|---|---|
| WO | WO 2010/095536 A1 | 8/2010 |
| WO | WO 2010/147982 A2 | 12/2010 |
| WO | WO 2011/036689 A1 | 3/2011 |
| WO | WO 2011/041781 A2 | 4/2011 |
| WO | WO2011/081249 A1 | 7/2011 |

OTHER PUBLICATIONS

Hansen, George, et al., "Electrically Conductive Putty-Type Repair System for Composite Structures," Sampe Conference Proceedings (2007) vol. 52, pp. 266/1-266/15.
Suchentrunk, Richard, et al., "Coatings on Composites—New Developments and Applications in the Aerospace Industry," Report (1992), MBB-Z-0443-92-PUB, ETN-93-93444, Sci. Tech. Aerosp. Rep. 1993, 31(7) 29 pgs.
Johnson, C. J., et al., "CFRP Blistering Induced by Phosphate-fluoride Coated Titanium Fasteners," Proc. ADVMAT/91, International Symposium Environ. Eff. Adv. Mater., 1st (1992), Meeting Date 1991, pp. 6/1-6/4.
Chung, D. D. L., et al., "Strengthening Graphite-Polymer Composites by Using Intercalated Graphite," *Interface in Polymer, Ceramic, and Metal Matrix Composites*; Cleveland, Ohio; Jun. 13, 1988, Conference Paper, pp. 101-105.
Griffin, Charles F., "Fuel Containment and Damage Tolerance in Large Composite Primary Aircraft Structures," *NASA Contractor Report 166083*; Contract NASI-16856, Mar. 1983, 15pgs.
Brick, R. O., et al., "The Significance of Advanced Structural Fabrication Techniques on Aircraft Lightning Protection," *Society of Automotive Engineers, Document 680290*, 1968, pp. 923-931.
Prandy, J. M., et al., "Environmentally Durable Lightning Strike Protection Materials for Composites," 37th International SAMPE Symposium, Mar. 9-12, 1992, pp. 78-87.
Guillaumon, Jean-Claude, "New Developments in Thermo-Optical Coatings for Space Vehicles Antistatic and Lightening Paints for Launchers," IAF, Int'l Astronautical Congress, 40th, Malaga, Spain; Oct. 7-13, 1989, 5 pgs.
Guerard, Francoise, et al., "New Developments in Thermo-Optical Coatings for Space Vehicles," European Symposium on Spacecraft Materials in Space Environment, 4th, Toulouse, France; Sep. 6-9, 1988, pp. 549-562.
Billias, Michael G., et al., "Electrically Conductive Structural Adhesive," 30th National SAMPE Symposium and Exhibition, vol. 30; Anaheim, California; Mar. 19-21, 1985, cover page and pp. 1397-1407 (12 pgs.).
Pachamuthu, Ashok, et al., "Enhancement of Electrical and Thermal Conductivity of Conductive Coatings and Adhesives by Addition of Nanometer Sized Particles," *Materials Science and Technology (MS&T)* 2006: Materials and Systems vol. 2, pp. 327-332.
Kim, Woon-Soo, et al., "Electrical Properties of PVdF/PVP Composite Filled with Carbon Nanotubes Prepared by Floating Catalyst Method," *Macromolecular Research*, vol. 10, No. 5, pp. 253-258 (2002).
Huang, Chi-Yuan, et al., "The manufacture and investigation of multi-walled carbon nanotube/polypyrrole/ EVA nano-polymeric composites for electromagnetic interference shielding," *Thin Solid Films*, vol. 519 (2011) pp. 4765-4773.
Lee, Eun-Je, et al., "Resistivity and crystallization behavior of saponified EVA/carbon black and EVA/graphite composites," Abstracts of Papers, 241st ACS National Meeting & Exposition, Anaheim, CA; Mar. 27-31, 2011, PMSE-176. American Chemical Society: Washington, D.C. (1 pg.).
Rahaman, M., et al., "Development of high performance EMI shielding material from EVA, NBR, and their blends: effect of carbon black structure," *Journal of Materials Science*, (2011) vol. 46, pp. 3989-3999.
Thomassin, J. -M., et al., "Polymer/carbon nanotube composites for electromagnetic interference reduction," *Physical Properties and Applications of Polymer Nanocomposites*, (2010) pp. 563-587.

Sarlin, Juha, et al., "PP composites with Hybrid Nanofillers: NTC phenomenon," AIP Conference Proceedings (2010), CP1255, Vth International Conference on Times of Polymers (TOP) and Composites, cover page and pp. 85-88 (5 pgs.).
Al-Saleh, Mohammed H., et al., "Processing-microstructure-property relationship in conductive polymer nanocomposites," *Polymer*, vol. 51 (2010) pp. 2740-2747.
Ray, Moumita, et al., "An Investigation of the Electromagnetic Shielding Effectiveness of Ethylene Vinyl Acetate Elastomer Reinforced With Carbon Nanofillers," *Polymers & Polymer Composites*, (2010) vol. 18, No. 2, pp. 59-65.
Saini, Parveen, et al., "Polyaniline-MWCNT nanocomposites for microwave absorption and EMI shielding," *Materials Chemistry and Physics*, vol. 113 (2009) pp. 919-926.
Al-Saleh, Mohammed H., et al., "A review of vapor grown carbon nanofiber/polymer conductive composites," *Carbon*, vol. 47 (2009) pp. 2-22.
Bourdo, Shawn, et al., "Structural, Electrical, and Thermal Behavior of Graphite-Polyaniline Composites with Increased Crystallinity," *Advanced Functional Materials*, 2008, vol. 18, pp. 432-440.
Mohanraj, G. T., et al., "AC Impedance Analysis and EMI Shielding Effectiveness of Conductive SBR Composites," *Polymer Engineering and Science*, (2006) vol. 46, No. 10, pp. 1342-1349.
Ou, Runqing, et al., "Low Percolation Threshold Composites Consisting of PMMA and Carbon Black," *School of Materials Science and Engineering, TMS Letters*, (2005) vol. 2, pp. 117-118.
El-Tantawy, Farid, "Development of Novel Functional Conducting Elastomer Blends Containing Butyl Rubber and Low-Density Polyethylene for Current Switching, Temperature Sensor, and EMI Shielding Effectiveness Applications," *Journal of Applied Polymer Science*, (2005) vol. 97, pp. 1125-1138.
Heiser, Jessica A., et al., "Shielding Effectiveness of Carbon-Filled Nylon 6,6," *Polymer Composites*, Aug. 2004, vol. 25, No. 4, pp. 407-416.
Das, N. C., et al., "Electromagnetic Interference Shielding Effectiveness of Hybrid Conductive Polymer Composite," *Journal of Elastomers and Plastics*, vol. 34, Jul. 2002, pp. 199-223.
Clingerman, Matthew L., et al., "Synergistic Effects of Carbon Fillers in Electrically Conductive Nylon 6,6 and Polycarbonate Based Resins," *Polymer Composites*, Oct. 2002, vol. 23, No. 5, pp. 911-924.
Rimska, Zdaka, et al., "AC Conductivity of Carbon Fiber-Polymer Matrix Composites at the Percolation Threshold," *Polymer Composites*, Feb. 2002, vol. 23, No. 1, pp. 95-103.
Das, N. C., et al., "Electromagnetic Interference Shielding Effectiveness of Conductive Carbon Black and Carbon Fiber-Filled Composites Based on Rubber and Rubber Blends," *Advances in Polymer Technology*, vol. 20, No. 3, pp. 226-236 (2001).
Das, N. C., et al., "Electromagnetic Interference Shielding Effectiveness of Ethylene Vinyl Acetate Based Conductive Composites Containing Carbon Fillers," *Journal of Applied Polymer Science*, vol. 80, pp. 1601-1608 (2001).
Das, N. C., et al., "Electromagnetic interference shielding effectiveness of carbon black and carbon fibre filled EVA and NR based composites," *Composites Part A: Applied Science and Manufacturing*, vol. 31 (2000) pp. 1069-1081.
Patel, Niraj, "New Thermoplastic Resin Compounds Utilizing Highly Efficient Conductive Filler System," General Electric Company, Annual Technical Conference—Society of Plastics Engineers (2000), 58th (vol. 2), 5 pgs.
Sau, K. P., et al., "Electromagnetic interference shielding by carbon black and carbon fibre filled rubber composites," *Plastics, Rubber and Composites Processing and Applications*, 1997, vol. 26, No. 7, pp. 291-297.
Praminik, P. K., et al., "Electromagnetic Interference Shielding by Conductive Nitrile Rubber Composites Containing Carbon Fillers," *Journal of Elastomers and Plastics*, vol. 23, Oct. 1991, pp. 345-361.
Crosby, J. M., et al., "Conductive thermoplastic composites," *Rubber World*, Nov. 1985, pp. 30-33.
Bigg, D. M., "An Investigation of the Effect of Carbon Black Structure, Polymer Morphology, and Processing History on the Electrical Conductivity of Carbon-Black-Filled Thermoplastics," *Journal of Rheology*, (1984) vol. 28, No. 5, pp. 501-516.

* cited by examiner

CONDUCTIVE SEALANT COMPOSITIONS

CROSS REFERENCE TO RELATED APPLICATION

This application claims priority to and the benefit of U.S. Provisional Application Ser. No. 61/535,886, filed on Sep. 16, 2011 and entitled CONDUCTIVE SEALANT COMPOSITIONS, the entire content of which is incorporated herein by reference.

TECHNICAL FIELD

The present disclosure relates to sealant compositions exhibiting enhanced EMI/RFI shielding effectiveness.

BACKGROUND

During flight, aircraft face a number of environmental occurrences that can cause dangerous conditions or even physical damage. For example, lightning strikes and electromagnetic interference (EMI) are fairly common environmental occurrences that may lead to dangerous conditions during aircraft flight. Lightning strikes may cause physical damage to the aircraft by puncturing holes through parts of the aircraft, or may cause a dangerous surge current which may contact the fuel reservoir and result in an explosion. EMI may cause excessive energy levels in the wiring and probes of the aircraft's fuel system. Additionally, the electromagnetic noise caused by EMI may result in serious operational difficulties in the electronic components of the aircraft. Given the potential for severe damage or electrical interference caused by these environmental occurrences, means for preventing or mitigating the adverse effects of lightning strikes and EMI are important in aircraft design and manufacture.

SUMMARY

In embodiments of the present invention, a sealant composition includes a base composition having a sulfur-containing polymer, a curing agent composition having a curing agent, and an electrically conductive filler in at least one of the base composition or the curing agent composition. The electrically conductive filler includes carbon nanotubes and stainless steel fibers.

In some embodiments, the sealant composition is substantially nickel free.

The stainless steel fibers may have an average particle dimension larger than an average particle dimension of the carbon nanotubes, or the carbon nanotubes may have an average particle dimension larger than an average particle dimension of the stainless steel fibers. In some embodiments, for example, the carbon nanotubes may have an average length dimension of about 5 µm to about 30 µm, and an average diameter dimension of about 10 nm to about 30 nm, and the stainless steel fibers may have an average first dimension of about 8 µm to about 22 µm, and an average second dimension of about 330 µm to about 1 mm. Also, the volume ratio of the carbon nanotubes to the stainless steel fibers may be about 1:1 to 1:50.

In some embodiments, the sealant compositions further include at least one of an adhesion promoter, a corrosion inhibitor or a plasticizer in at least one of the base composition or the curing agent composition.

In some embodiments, the sulfur-containing polymer is a polysulfide or a polythioether.

According to some embodiments, a sealant composition includes a substantially nickel-free base composition including a sulfur-containing polymer, a substantially nickel-free curing agent composition including a curing agent, and a substantially nickel-free electrically conductive filler in at least one of the base composition or the curing agent composition. The electrically conductive filler includes carbon nanotubes and stainless steel fibers. The stainless steel fibers may have an average particle dimension larger than an average particle dimension of the carbon nanotubes, or the carbon nanotubes have an average particle dimension larger than an average particle dimension of the stainless steel fibers. In some embodiments, for example, the carbon nanotubes have an average length dimension of about 5 µm to about 30 µm, and an average diameter dimension of about 10 nm to about 30 nm, and the stainless steel fibers have an average first dimension of about 8 µm to about 22 µm, and an average second dimension of about 330 µm to about 1 mm. Also, the volume ratio of the carbon nanotubes to the stainless steel fibers may be about 1:5 to 1:50.

The sealant compositions are substantially Ni-free and exhibit unexpectedly superior EMI/RFI shielding effectiveness.

DETAILED DESCRIPTION

In certain embodiments of the present disclosure, a sealant composition comprises at least one sulfur-containing polymer, and an electrically conductive filler comprising carbon nanotubes and stainless steel fibers. The term "sealant," "sealing," or "seal" as used herein refers to compositions that have the ability to resist atmospheric conditions such as moisture and temperature and at least partially block the transmission of materials such as water, fuel, and other liquids and gasses. Sealants often have adhesive properties, but are not simply adhesives that do not have the blocking properties of a sealant.

Sealant compositions of the present disclosure can be prepared by blending an electrically conductive base composition, and a curing agent composition. A base composition and a curing agent composition can be prepared separately, and then blended to form a sealant composition. A conductive base composition can comprise, for example, at least one sulfur-containing polymer, at least one plasticizer, at least one adhesion promoter, at least one corrosion inhibitor, at least one electrically non-conductive filler, and an electrically conductive filler comprising carbon nanotubes and stainless steel fibers. However, it is understood that the base compositions need not contain each of these components. For example, many of these components are optional, for example, the plasticizer, adhesion promoter, corrosion inhibitor, electrically non-conductive filler, and electrically conductive filler. Accordingly, the base composition, in some embodiments, may contain only the polymer (which may be either or both a polysulfide and/or a polythioether), and a solvent. However, as discussed below, at least one of the base composition and/or curing agent composition includes a conductive filler comprising carbon nanotubes and stainless steel fibers.

A curing agent composition can comprise, for example, at least one curing agent, at least one plasticizer, at least one electrically non-conductive filler, at least one electrically conductive filler, and at least one cure accelerator. However, like the base composition, the curing agent composition need not contain each of these components. Indeed, many of these components are optional, for example, the plasticizer, electrically non-conductive filler, electrically conductive filler, and cure accelerator. Accordingly, the curing agent composition, in some embodiments, may contain only the curing agent. However, as discussed below, at least one of the base composition and/or curing agent composition includes a conductive filler comprising carbon nanotubes and stainless steel fibers.

In certain embodiments, 5 to 20 parts by weight of a curing agent composition are blended with 100 parts by weight of a base composition, and in certain embodiments, 8 to 16 parts by weight of curing agent composition are blended with 100 parts by weight of a base composition to form an electrically conductive sealant composition.

In certain embodiments, two-component curable compositions are preferred over one-component curable compositions because the two-component compositions provide the best rheology for application and exhibit desirable physical and chemical properties in the resultant cured composition. As used herein, the two components are referred to as the base composition, and the curing agent composition. In certain embodiments, the base composition can comprise polysulfide polymers, polythioether polymers, oxidizing agents, additives, fillers, plasticizers, organic solvents, adhesion promoters, corrosion inhibitors, and combinations thereof. However, it is understood that the base compositions need not contain each of these components. For example, many of these components are optional, for example, the oxidizing agents, additives, fillers, plasticizers, adhesion promoters, and corrosion inhibitors. Accordingly, the base composition, in some embodiments, may contain only the polymer (which may be either or both a polysulfide and/or a polythioether), and a solvent. However, as discussed below, at least one of the base composition and/or curing agent composition includes a conductive filler comprising carbon nanotubes and stainless steel fibers.

In certain embodiments, the curing agent composition can comprise curing agents, cure accelerators, cure retardants, plasticizers, additives, fillers, and combinations thereof. However, like the base composition, the curing agent composition need not contain each of these components. Indeed, many of these components are optional, for example, the cure accelerators, cure retardants, plasticizers, additives, and fillers. Accordingly, in some embodiments, the curing agent composition may contain only the curing agent. However, as discussed below, at least one of the base composition and/or curing agent composition includes a conductive filler comprising carbon nanotubes and stainless steel fibers.

At least one of the base composition and the curing composition includes a conductive filler comprising carbon nanotubes and stainless steel fibers. The conductive filler may further include any additional conductive filler conventionally used in sealant compositions. However, in some embodiments, the optional additional conductive filler is substantially Ni-free in order to reduce toxicity and adverse environmental concerns. In some embodiments, for example, the conductive filler includes graphite in addition to the carbon nanotubes and stainless steel fibers. As used herein, the term "substantially" is used as a term of approximation, and not as a term of degree. Additionally, the term "substantially nickel-free" is used as a term of approximation to denote that the amount of nickel in the additional conductive filler or sealant composition is negligible, such that if nickel is present in the additional conductive filler or sealant composition at all, it is as an incidental impurity.

In certain embodiments, sulfur-containing polymers useful in the practice of the present disclosure include polysulfide polymers that contain multiple sulfide groups, i.e., —S—, in the polymer backbone and/or in the terminal or pendent positions on the polymer chain. Such polymers are described in U.S. Pat. No. 2,466,963 wherein the disclosed polymers have multiple —S—S-linkages in the polymer backbone, the entire content of which is incorporated herein by reference. Other useful polysulfide polymers are those in which the polysulfide linkage is replaced with a polythioether linkage, i.e., —[—$CH_2$—$CH_2$—S—$CH_2$—$CH_2$—]$_n$— where n can be an integer ranging from 8 to 200 as described in U.S. Pat. No. 4,366,307, the entire content of which is incorporated herein by reference. In some embodiments, for example, the polythioether polymers may be those described in U.S. Pat. No. 6,172,179, the entire content of which is incorporated herein by reference. For example, the polythioether polymer may be the polythioether prepared in Example 1 of U.S. Pat. No. 6,172,179. The polysulfide polymers can be terminated with non-reactive groups such as alkyl, although in certain embodiments, the polysulfide polymers contain reactive groups in the terminal or pendent positions. Typical reactive groups are thiol, hydroxyl, amino, and vinyl. Such polysulfide polymers are described in the aforementioned U.S. Pat. No. 2,466,963, U.S. Pat. No. 4,366,307, and U.S. Pat. No. 6,372,849, the entire content of each of which is incorporated herein by reference. Such polysulfide polymers can be cured with curing agents that are reactive with the reactive groups of the polysulfide polymer.

Sulfur-containing polymers of the present disclosure can have number average molecular weights ranging from 500 to 8,000 grams per mole, and in certain embodiments, from 1,000 to 5,000 grams per mole, as determined by gel permeation chromatography using a polystyrene standard. For sulfur-containing polymers that contain reactive functional groups, the sulfur-containing polymers can have average functionalities ranging from 2.05 to 3.0, and in certain embodiments ranging from 2.1 to 2.6. A specific average functionality can be achieved by suitable selection of reactive components. Nonlimiting examples of sulfur-containing polymers include those available from PRC-DeSoto International, Inc. under the trademark PERMAPOL, specifically, PERMAPOL P-3.1 or PERMAPOL P-3, and from Akros Chemicals, such as THIOPLAST G4.

A sulfur-containing polymer can be present in the base composition in an amount ranging from about 10% to about 80% by weight of the total weight of the base composition, and in certain embodiments can range from about 10% to about 40% by weight, and in other embodiments can range from about 20% to about 30% by weight. In certain embodiments, the sulfur-containing polymer comprises a combination of a polysulfide polymer and a polythioether polymer, and the amounts of polysulfide polymer and polythioether polymer can be similar. For example, in some embodiments, the amount of polysulfide polymer and the amount of polythioether polymer in a base composition can each range from about 10% by weight to about 15% by weight of the total weight of the base composition.

The sealant compositions of the present disclosure comprise at least one curing agent for curing the at least one sulfur-containing polymer. The term "curing agent" refers to any material that can be added to a sulfur-containing polymer to accelerate the curing or gelling of the sulfur-containing polymer. Curing agents are also known as accelerators, catalysts or cure pastes. In certain embodiments, the curing agent is reactive at a temperature ranging from 10° C. to 80° C. The term "reactive" means capable of chemical reaction and includes any level of reaction from partial to complete reaction of a reactant. In certain embodiments, a curing agent is reactive when it provides for cross-linking or gelling of a sulfur-containing polymer.

In certain embodiments, the sealant compositions comprise at least one curing agent that contains oxidizing agents capable of oxidizing terminal mercaptan groups of the sulfur-containing polymer to form disulfide bonds. Useful oxidizing agents include, for example, lead dioxide, manganese dioxide, calcium dioxide, sodium perborate monohydrate, calcium peroxide, zinc peroxide, and dichromate. The curing agent may also be an epoxy resin, or the curing agent may include a mixture of another oxidizing agent and an epoxy resin. The amount of curing agent in a curing agent composition can range from about 25% by weight to about 75% by weight of the total weight of the curing agent composition. Additives such as sodium stearate can also be included to improve the stability of the accelerator. For example, a curing agent composition can comprise an amount of cure accelerator ranging from about 0.1% to about 1.5% by weight based on the total weight of the curing agent composition.

In certain embodiments, sealant compositions of the present disclosure can comprise at least one curing agent containing at least one reactive functional group that is reactive with functional groups attached to the sulfur-containing polymer. Useful curing agents containing at least one reactive functional group that is reactive with functional groups attached to the sulfur-containing polymer include polythiols, such as polythioethers, for curing vinyl-terminated polymers; polyisocyanates such as isophorone diisocyanate, hexamethylene diisocyanate, and mixtures and isocyanurate derivatives thereof for curing thiol-, hydroxyl- and amino-terminated polymers; and, polyepoxides for curing amine- and thiol-terminated polymers. Nonlimiting examples of polyepoxides include hydantoin diepoxide, Bisphenol-A epoxides, Bisphenol-F epoxides, Novolac-type epoxides, aliphatic polyepoxides, and epoxidized unsaturated resins, and phenolic resins. The term "polyepoxide" refers to a material having a 1,2-epoxy equivalent greater than one and includes monomers, oligomers, and polymers.

The sealant composition can optionally comprise at least one compound to modify the rate of cure. For example, cure accelerants such as dipentamethylene/thiuram/polysulfide mixture can be included in the sealant composition to accelerate the rate of cure, and/or at least one cure retardant such as stearic acid can be added to retard the rate of cure and thereby extend the work life of a sealant composition during application. In certain embodiments, the curing agent composition can comprise an amount of accelerant ranging from about 1% to about 7% by weight, and/or an amount of cure retardant ranging from about 0.1% to about 1% by weight, based on the total weight of the curing agent composition. To control the cure properties of the sealant composition, it can also be useful to include at least one material capable of at least partially removing moisture from the sealant composition such as a molecular sieve powder. In certain embodiments, a curing agent composition can comprise an amount of material capable of at least partially removing moisture ranging from about 0.1% to about t1.5% by weight, based on the total weight of the curing agent composition.

In certain embodiments, sealant compositions of the present disclosure can comprise fillers. As used herein, "filler" refers to a non-reactive component in the composition that provides a desired property, such as, for example, electrical conductivity, density, viscosity, mechanical strength, EMI/RFI shielding effectiveness, and the like.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Exemplary fillers may also include high band gap materials such as zinc sulfide and inorganic barium compounds. In certain embodiments, the base composition can comprise an amount of electrically non-conductive filler ranging from about 2% to about 10% by weight, based on the total weight of the base composition, and in certain embodiments, can range from about 3% to about 7% by weight. In certain embodiments, a curing agent composition can comprise an amount of electrically non-conductive filler ranging from less than 6 percent by weight, and in certain embodiments ranging from about 0.5% to about 4% by weight, based on the total weight of the curing agent composition.

According to embodiments of the present disclosure, either or both of the base composition and/or the curing agent composition includes a conductive filler comprising carbon nanotubes and stainless steel fibers. In some embodiments, the sealant composition includes about 80 to about 90% base composition and about 10 to about 20% curing agent composition, and the conductive filler including the carbon nanotubes and stainless steel fibers are included in the base composition. These fillers are used to impart electrical conductivity and EMI/RFI shielding effectiveness to the sealant compositions. The combination of the carbon nanotubes and stainless steel fibers forms an interactive conductive matrix which imparts unexpectedly superior electrical conductivity and EMI shielding effectiveness. In addition, this combination of carbon nanotubes and stainless steel fibers eliminates Ni, which has typically been used in conductive fillers in conventional sealant compositions. Indeed, according to embodiments of the present invention, the conductive filler, as well as the sealant composition, are substantially Ni-free, thereby substantially eliminating the toxicity and environmental downsides attributed to the inclusion of Ni in conventional sealant compositions. As discussed above, as used herein, the term "substantially" is used as a term of approximation, and not as a term of degree. Additionally, as discussed above, the term "substantially nickel-free" is used as a term of approximation to denote that the amount of the nickel in the sealant compositions is negligible, such that if nickel is present at all, it is as an incidental impurity.

The size of the carbon nanotubes and stainless steel fibers can vary as desired to adjust or modify the electrical conductivity and/or EMI shielding effectiveness of the sealant composition. However, in certain embodiments, one of the carbon nanotubes or the stainless steel fibers has an average particle (i.e., nanotube or fiber) dimension that is larger than an average particle (i.e., nanotube or fiber) dimension of the other of the carbon nanotubes or stainless steel fibers. For example, in some embodiments, the carbon nanotubes may have a length dimension ranging from about 5 to about 30 µm, and a diameter dimension ranging from about 10 to about 30 nm. The stainless steel fibers may have dimensions of about 8 µm×about 330 µm to about 22 µm×about 1 mm. Also, a volume ratio of the carbon nanotubes to the stainless steel fibers may range from about 1:5 to about 1:50. In one embodiment, for example, the volume ratio of the carbon nanotubes to the stainless steel fibers is about 1:5.

The sealant compositions may also optionally include one or more corrosion inhibitors Nonlimiting examples of suitable corrosion inhibitors include strontium chromate, calcium chromate, magnesium chromate, and combinations thereof. U.S. Pat. No. 5,284,888 and U.S. Pat. No. 5,270, 364, the entire contents of which are incorporated herein by reference, disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the sealant composition. In certain embodiments, the corrosion inhibitor can comprise an amount ranging from about 2% by weight to about 8% by weight of the total weight of the sealant composition.

In certain embodiments, the sealant compositions may optionally further comprise one or more plasticizers, non-limiting examples of which include phthalate esters, chlorinated paraffins, hydrogenated terphenyls, partially hydrogenated terphenyls, and the like. The plasticizer may be included in either or both of the base composition and/or the curing agent composition. In some embodiments, the plasticizer is included in the base composition in an amount ranging from about 0.1% to about 5% by weight based on the total weight of the base composition, and in certain embodiments, can range from about 0.5% to about 3% by weight. In some embodiments, the plasticizer is included in the curing agent composition in an amount ranging from about 20% to about 60% by weight of the total weight of the curing agent composition, and in certain embodiments, can range from about 30% to about 40% by weight.

In certain embodiments, the sealant compositions may optionally further comprise an organic solvent, such as a ketone or an alcohol, for example methyl ethyl ketone, and isopropyl alcohol, or a combination thereof.

In certain embodiments, the sealant compositions may optionally further comprise one or more adhesion promoters, nonlimiting examples of which include phenolic resins, silane adhesion promoters, and combinations thereof. Adhesion promoters help facilitate adhesion of the polymeric components of the sealant composition to a substrate, as well as to the electrically non-conductive and electrically conductive fillers in the sealant composition. The adhesion promoter may be included in either or both of the base composition and/or the curing agent composition. In certain embodiments, the adhesion promoter is included in the base composition in an amount ranging from about 0.10% to about 5.0% by weight (for phenolic adhesion promoters), from about 0.05% to about 1.0% by weight (for mercaptosilane adhesion promoters), or from about 0.05% to about 1.0% by weight (for epoxy-silane adhesion promoters). The total amount of adhesion promoter in the base composition can range from about 0.5% to 7% by weight, based on the total weight of the base composition.

In certain embodiments, the base composition can be prepared by batch mixing at least one sulfur-containing polymer, additives, and/or fillers in a double planetary mixer under vacuum. Other suitable mixing equipment includes a kneader extruder, sigma mixer, or double "A" arm mixer. For example, a base composition can be prepared by mixing at least one sulfur-containing polymer, plasticizer, and phenolic adhesion promoter. After the mixture is thoroughly blended, additional constituents can be separately added and mixed using a high shear grinding blade, such as a Cowless blade, until cut in. Examples of additional constituents that can be added to the base composition include the carbon nanotube/stainless steel conductive filler, corrosion inhibitors, non-conductive fillers, and silane adhesion promoters. The mixture can then be mixed for an additional 15 to 20 minutes under a vacuum of 27 inches of mercury or greater to reduce or remove entrapped air and/or gases. The base composition can then be extruded from the mixer using a high-pressure piston ram.

The curing agent composition can be prepared by batch mixing a curing agent, additives, and fillers. In certain embodiments, 75% of the total plasticizer (such as partially hydrogenated terphenyl) and an accelerant (such as a dipentamethylene/thiuram/polysulfide mixture) are mixed in a single-shaft anchor mixer. Molecular sieve powder is then added and mixed for 2 to 3 minutes. Fifty percent of the total manganese dioxide is then mixed until cut in. Stearic acid, sodium stearate, and the remaining plasticizer are then mixed until cut in followed by the remaining 50% of the manganese dioxide which is mixed until cut in. Fumed silica is then mixed until cut in. If the mixture is too thick a surfactant may be added to increase wetting. The curing agent composition is then mixed for 2 to 3 minutes, passed over a three-roll paint mill to achieve a grind, and returned to the single-shaft anchor mixer and mixed for an additional 5 to 10 minutes. The curing agent composition can then be removed from the mixer with a piston ram and placed into storage containers and aged for at least 5 days prior to combining with a base composition. The base composition and curing agent composition are mixed together to form the sealant composition, which can then be applied to a substrate.

It is noted that, as used in this disclosure, the singular forms "a," "an," and, "the" include plural referents unless expressly and unequivocally limited to one referent. Thus, for example, reference to "a filler" includes one or more fillers. Also it is noted that, as used herein, the term "polymer" refers to polymers, oligomers, homopolymers, and copolymers.

For the purposes of this disclosure, unless otherwise indicated, all numbers expressing quantities of ingredients or percentages or proportions of other materials, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. Embodiments of the present disclosure can be further defined by reference to the following example, which describes in detail the preparation of an exemplary composition of the present disclosure. It will be apparent to those skilled in the art that modifications, both to materials and methods, may be practiced without departing from the scope of the present disclosure.

EXAMPLE

The components of the base composition are indicated in the below table. Specifically, the base composition included 50.7 lbs of a carbon nanotube (CNT) dispersion (i.e., 1% carbon nanotubes dispersed in a polythioether polymer (Permapol P3.1e, available from PRC-DeSoto)), 2.2 lbs conductive graphite, 30.2 lbs stainless steel fibers, and 16.9 lbs solvent.

|  | Material | Amount (lbs) |
| --- | --- | --- |
| 1% CNT in P3.1e | CNT/Polymer | 50.7 |
| Graphite | conductive graphite | 2.2 |
| Stainless Steel fiber | conductive fibers | 30.2 |
| ethyl acetate | solvent | 16.9 |

To the 1% carbon nanotubes dispersed in a polythioether polymer, the graphite is added and mixed in a Hauschild Speed Mixer. The stainless steel fibers and ethyl acetate are then added and dispersed in the Speed Mixer.

The compositions were cured using a manganese or epoxy based curing agent composition to effect oxidative curing. For example, the curing agent composition may include a manganese oxide or epoxy based composition including a plasticizer and/or a cure rate modifier (e.g., a cure accelerant or a cure retardant). One example of a suitable curing agent composition is a composition including about 25% to about 75% manganese dioxide.

The present invention has been described with reference to exemplary embodiments and aspects, but is not limited thereto. Persons skilled in the art will appreciate that other modifications and applications can be made without meaningfully departing from the invention. For example, although the coating compositions are described as being useful for aerospace applications, they may be useful for other applications as well, including in other electronic devices requiring EMI/RFI shielding. Accordingly, the foregoing description should not be read as limited to the precise embodiments and aspects described, but should be read consistent with and as support for the following claims, which are to have their fullest and fairest scope.

Throughout the text and the claims, use of the word "about" in relation to a range of values is intended to modify both the high and low values recited, and reflects the penumbra of variation associated with measurement, significant figures, and interchangeability, all as understood by a person having ordinary skill in the art to which this invention pertains. Additionally, throughout this disclosure and the accompanying claims, it is understood that even those ranges that may not use the term "about" to describe the high and low values are also implicitly modified by that term, unless otherwise specified.

What is claimed is:

1. A sealant composition comprising:
   a base composition comprising a sulfur-containing polymer;
   a curing agent composition comprising a curing agent; and
   an electrically conductive filler in at least one of the base composition or the curing agent composition, the electrically conductive filler comprising carbon nanotubes and stainless steel fibers; wherein the stainless steel fibers have an average particle dimension larger than an average particle dimension of the carbon nanotubes wherein the stainless steel fibers have an average first dimension of about 8 μm to about 22 μm, and an average second dimension of about 330 μm to about 1 mm.

2. The sealant composition of claim 1, wherein the electrically conductive filler is in the base composition.

3. The sealant composition of claim 1, wherein the electrically conductive filler is in the curing agent composition.

4. The sealant composition of claim 1, wherein the electrically conductive filler is in both the curing agent composition and the base composition.

5. The sealant composition of claim 1, wherein the sealant composition is substantially nickel free.

6. The sealant composition of claim 1, wherein the carbon nanotubes have an average length dimension of about 5 μm to about 30 μm, and an average diameter dimension of about 10 nm to about 30 nm.

7. The sealant composition of claim 1, wherein a volume ratio of the carbon nanotubes to the stainless steel fibers is about 1:5 to 1:50.

8. The sealant composition of claim 1, further comprising at least one of an adhesion promoter, a corrosion inhibitor or a plasticizer in at least one of the base composition or the curing agent composition.

9. The sealant composition of claim 1, wherein the sulfur-containing polymer is a polysulfide or a polythioether.

10. A sealant composition comprising:
    a base composition comprising a sulfur-containing polymer;
    a curing agent composition comprising a curing agent; and
    an electrically conductive filler in at least one of the base composition or the curing agent composition, the electrically conductive filler comprising carbon nanotubes and stainless steel fibers; wherein the carbon nanotubes have an average particle dimension larger than an average particle dimension of the stainless steel fibers wherein the stainless steel fibers have an average first dimension of about 8 μm to about 22 μm, and an average second dimension of about 330 μm to about 1 mm.

11. The sealant composition of claim 10, wherein the electrically conductive filler is in the base composition.

12. The sealant composition of claim 10, wherein the electrically conductive filler is in the curing agent composition.

13. The sealant composition of claim 10, wherein the electrically conductive filler is in both the curing agent composition and the base composition.

14. The sealant composition of claim 10, wherein the sealant composition is substantially nickel free.

15. The sealant composition of claim 10, wherein the carbon nanotubes have an average length dimension of about 5 μm to about 30 μm, and an average diameter dimension of about 10 nm to about 30 nm.

16. The sealant composition of claim 10, wherein a volume ratio of the carbon nanotubes to the stainless steel fibers is about 1:5 to 1:50.

17. The sealant composition of claim 10, further comprising at least one of an adhesion promoter, a corrosion inhibitor or a plasticizer in at least one of the base composition or the curing agent composition.

18. The sealant composition of claim 10, wherein the sulfur-containing polymer is a polysulfide or a polythioether.

19. A sealant composition comprising:
    a substantially nickel-free base composition comprising a sulfur-containing polymer;
    a substantially nickel-free curing agent composition comprising a curing agent; and
    a substantially nickel-free electrically conductive filler in at least one of the base composition or the curing agent composition, the electrically conductive filler comprising carbon nanotubes and stainless steel fibers; wherein the stainless steel fibers have an average particle dimension larger than an average particle dimension of the carbon nanotubes fibers wherein the stainless steel fibers have an average first dimension of about 8 μm to about 22 μm, and an average second dimension of about 330 μm to about 1 mm.

20. The sealant composition of claim 19, wherein the carbon nanotubes have an average length dimension of about 5 μm to about 30 μm, and an average diameter dimension of about 10 nm to about 30 nm.

21. The sealant composition of claim 19, wherein a volume ratio of the carbon nanotubes to the stainless steel fibers is about 1:5 to 1:50.

22. A sealant composition comprising:
a substantially nickel-free base composition comprising a sulfur-containing polymer;
a substantially nickel-free curing agent composition comprising a curing agent; and
a substantially nickel-free electrically conductive filler in at least one of the base composition or the curing agent composition, the electrically conductive filler comprising carbon nanotubes and stainless steel fibers; wherein the carbon nanotubes have an average particle dimension larger than an average particle dimension of the stainless steel fibers wherein the stainless steel fibers have an average first dimension of about 8 μm to about 22 μm, and an average second dimension of about 330 μm to about 1 mm.

23. The sealant composition of claim 22, wherein the carbon nanotubes have an average length dimension of about 5 μm to about 30 μm, and an average diameter dimension of about 10 nm to about 30 nm.

24. The sealant composition of claim 22, wherein a volume ratio of the carbon nanotubes to the stainless steel fibers is about 1:5 to 1:50.

* * * * *